US010200200B2

(12) United States Patent
Uchikawa

(10) Patent No.: US 10,200,200 B2
(45) Date of Patent: Feb. 5, 2019

(54) INFORMATION PROCESSING APPARATUS CAPABLE OF PERFORMING SSL COMMUNICATION, METHOD OF CONTROLLING THE SAME, AND STORAGE MEDIUM

(71) Applicant: CANON KABUSHIKI KAISHA, Tokyo (JP)

(72) Inventor: Shinichi Uchikawa, Matsudo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 63 days.

(21) Appl. No.: 14/993,587

(22) Filed: Jan. 12, 2016

(65) Prior Publication Data

US 2016/0204947 A1 Jul. 14, 2016

(30) Foreign Application Priority Data

Jan. 14, 2015 (JP) .................. 2015-004927

(51) Int. Cl.
*H04L 9/32* (2006.01)
*G06F 17/30* (2006.01)
(Continued)

(52) U.S. Cl.
CPC ........ *H04L 9/3263* (2013.01); *G06F 17/3089* (2013.01); *H04L 9/0844* (2013.01);
(Continued)

(58) Field of Classification Search
CPC .................................................... H04L 9/3263
(Continued)

(56) References Cited

U.S. PATENT DOCUMENTS 7,216,292 B1 * 5/2007 Snapper ................ G06F 17/243
715/234
7,430,755 B1 * 9/2008 Hughes ............... H04L 63/0823
726/3
(Continued)

FOREIGN PATENT DOCUMENTS

JP  2007194730 A  8/2007
JP  2007208429 A  8/2007
(Continued)

OTHER PUBLICATIONS

Extended European Search Report issued in European Appln. No. 16151010.2 dated Apr. 11, 2016.
(Continued)

*Primary Examiner* — Dant B Shaifer Harriman
(74) *Attorney, Agent, or Firm* — Rossi, Kimms & McDowell LLP

(57) ABSTRACT

An information processing apparatus information processing apparatus capable of setting proper identifying information for identifying the information processing apparatus, and performing SSL communication. The information processing apparatus is capable of performing SSL communication and issuing a certificate. A CPU of the apparatus receives a request for acquiring a Web page for use in issuing the Web page. The CPU acquires identification information of the apparatus from the request received from the client. The CPU generates the Web page which is for use in issuing the certificate and in which the identification information of the apparatus is set. The CPU transmits the generated Web page to the client as a response to the request.

11 Claims, 12 Drawing Sheets

(51) Int. Cl.
*H04L 29/06* (2006.01)
*H04L 9/08* (2006.01)

(52) U.S. Cl.
CPC ........ *H04L 9/3268* (2013.01); *H04L 63/0823* (2013.01); *H04L 63/166* (2013.01); *H04L 2209/64* (2013.01)

(58) Field of Classification Search
USPC ........................................................ 713/175
See application file for complete search history.

(56) References Cited

U.S. PATENT DOCUMENTS

| | | | | |
|---|---|---|---|---|
| 7,788,495 | B2* | 8/2010 | Anthe, II | H04L 63/0823 713/175 |
| 8,850,186 | B2* | 9/2014 | Yamauchi | H04L 63/0823 713/155 |
| 2002/0126850 | A1* | 9/2002 | Allen | H04L 9/0825 380/277 |
| 2003/0084294 | A1* | 5/2003 | Aoshima | G06F 21/6245 713/169 |
| 2006/0182042 | A1 | 8/2006 | Nasu | |
| 2007/0168658 | A1* | 7/2007 | Yamauchi | H04L 63/0823 713/156 |
| 2007/0194730 | A1* | 8/2007 | Fukamizu | H02P 6/182 318/400.09 |
| 2007/0208429 | A1* | 9/2007 | Leahy | A61F 2/0004 623/23.68 |
| 2009/0001855 | A1* | 1/2009 | Lipton | G06F 3/016 310/331 |
| 2009/0092247 | A1* | 4/2009 | Kido | H04L 63/062 380/30 |
| 2014/0259131 | A1* | 9/2014 | Gough | H04L 63/0823 726/6 |

FOREIGN PATENT DOCUMENTS

| | | |
|---|---|---|
| JP | 2009200565 A | 9/2009 |
| WO | 2009001855 A1 | 12/2008 |

OTHER PUBLICATIONS

Tabor, "Secure your Synology NAS, install a SSL certificate", URL:https://miketabor.com/secure-synology-nas-install-ssl-certificate/, Feb. 10, 2014, pp. 1-13, Retrieved Mar. 31, 2016. XP055261905. Cited in NPL 1.

Office Action issued in European Appln. No. 16151010.2 dated Mar. 5, 2018.

Office Action issued in Japanese Appln. No. 2015-004927 dated Aug. 28, 2018.

* cited by examiner

*FIG. 6*

| http://hoge.xxx.co.jp/generate_cert.cgi |
|---|

KeySettings

- Key Name
- Signature Algorithm
- Key Algorithm

Certificate Settings

- Validity Start Date(YYYY/MM/DD)
- Validity End Date(YYYY/MM/DD)
- Country/Region
- State
- City
- Organization
- CommonName  hoge.xxx.co.jp

| NETWORK SETTING | |
|---|---|
| IPv4 ADDRESS | 172.24.160.232 |
| IPv4 HOST NAME | hogehoge |
| IPv4 DOMAIN NAME | xxx.co.jp |
| IPv6 ADDRESS | 2001:0db8:0000:0000:0000:0000:de11:be11 |
| IPv6 HOST NAME | hoge6 |
| IPv6 DOMAIN NAME | xxx.co.jp |
| | OK |

# INFORMATION PROCESSING APPARATUS CAPABLE OF PERFORMING SSL COMMUNICATION, METHOD OF CONTROLLING THE SAME, AND STORAGE MEDIUM

BACKGROUND OF THE INVENTION

Field of the Invention

The present invention relates to an information processing apparatus, a method of controlling the same, and a storage medium, and more particularly to an information processing apparatus that performs SSL communication, a method of controlling the same, and a storage medium.

Description of the Related Art

When performing network communication with a client apparatus, such as a PC and a mobile terminal, an MFP (multifunction peripheral) having a function of issuing an SSL server certificate for performing SSL communication uses SSL communication for communicating encrypted data so as to prevent information from leaking from the data being transmitted or received. The MFP is equipped with the function of issuing an SSL server certificate for performing SSL communication, and the SSL server certificate is issued as a self-certificate of the MFP, which includes a common name for identifying the MFP as a self-certifying object. Normally, the common name is set based on information for identifying the MFP, which is included in URL information used for performing network communication including SSL communication between a client PC and the MFP (hereinafter referred to as the "identification information of the MFP"). As the identification information of the MFP, for example, one of an IP address, an FQDN (Fully Qualified Domain Name), and an mDNS (Multicast DNS) name of the MFP is used.

When the client PC performs SSL communication with the MFP, the MFP transmits the SSL server certificate in response to a notification transmitted from the client PC for requesting execution of SSL communication. Then, if the common name of the acquired SSL server certificate does not correspond to, in other words, for example, does not match the identification information of the MFP, the client PC displays a warning on a display screen thereof without performing SSL communication.

On the other hand, as a method of setting the common name, which is different from the conventional method, there has been known a technique of issuing an SSL server certificate by setting an IP address of the MFP at the initial startup time thereof, as a common name (see e.g. Japanese Patent Laid-Open Publication No. 2009-200565).

However, as the identification information of the MFP, not only the IP address of the MFP, but also the FQDN or the mDNS name is sometimes used as mentioned above, and hence when the SSL server certificate of the MFP, in which the IP address of the MFP at the initial startup time is set as the common name, is issued using the technique disclosed in Japanese Patent Laid-Open Publication No. 2009-200565, there is a case where the common name of the SSL server certificate and the identification information of the MFP do not match each other. To cope with this, it is necessary to reissue the SSL server certificate having the common name changed, but when the common name is reset by a user, there is a case where a proper common name, i.e. a common name corresponding to the identification information of the MFP is not set e.g. due to an erroneous input by the user.

SUMMARY OF THE INVENTION

The invention provides an information processing apparatus that is capable of setting proper identifying information for identifying the information processing apparatus, and performing SSL communication, a method of controlling the same, and a storage medium.

In a first aspect of the invention, there is provided an information processing apparatus that is capable of performing SSL communication and has a function of issuing a certificate, comprising a reception unit configured to receive an acquisition request for acquiring a Web page for use in issuing a certificate, from a client apparatus, an acquisition unit configured to acquire identification information of the information processing apparatus from the acquisition request received by said acquisition unit, a generation unit configured to generate the Web page which is for use in issuing the certificate and in which the identification information of the information processing apparatus is set, and a transmission unit configured to transmit the Web page generated by the generation unit, as a response to the acquisition request, to the client apparatus.

In a second aspect of the invention, there is provided a method of controlling an information processing apparatus that is capable of performing SSL communication and has a function of issuing a certificate, comprising receiving an acquisition request for acquiring a Web page for use in issuing a certificate, from a client apparatus, acquiring identification information of the information processing apparatus from the acquisition request received by said receiving, generating the Web page which is for use in issuing the certificate and in which the identification information of the information processing apparatus is set, and transmitting the Web page generated by said generating, as a response to the acquisition request, to the client apparatus.

In a third aspect of the invention, there is provided a non-transitory computer-readable storage medium storing a computer-executable program for causing a computer to execute a method of controlling an information processing apparatus that is capable of performing SSL communication and has a function of issuing a certificate, wherein the method comprises receiving an acquisition request for acquiring a Web page for use in issuing a certificate, from a client apparatus, acquiring identification information of the information processing apparatus from the acquisition request received by said receiving, generating the Web page which is for use in issuing the certificate and in which the identification information of the information processing apparatus is set, and transmitting the Web page generated by said generating, as a response to the acquisition request, to the client apparatus.

According to the invention, it is possible to set proper identifying information for identifying an information processing apparatus, and perform SSL communication.

Further features of the present invention will become apparent from the following description of exemplary embodiments (with reference to the attached drawings).

BRIEF DESCRIPTION OF THE DRAWINGS

FIG. 6 is a diagram useful in explaining a certificate setting menu displayed on a console panel appearing in FIG. 2.

FIG. 8 is a diagram useful in explaining network setting information used in the certificate setting information generation process in FIG. 7.

DESCRIPTION OF THE EMBODIMENTS

The present invention will now be described in detail below with reference to the accompanying drawings showing embodiments thereof.

In the present embodiments, the description will be given of a case where the invention is applied to an MFP as an information processing apparatus, but application of the invention is not limited to the MFP, and the invention can be applied to any other apparatus, insofar as it is an apparatus that is capable of issuing an SSL server certificate.

Figure 1:
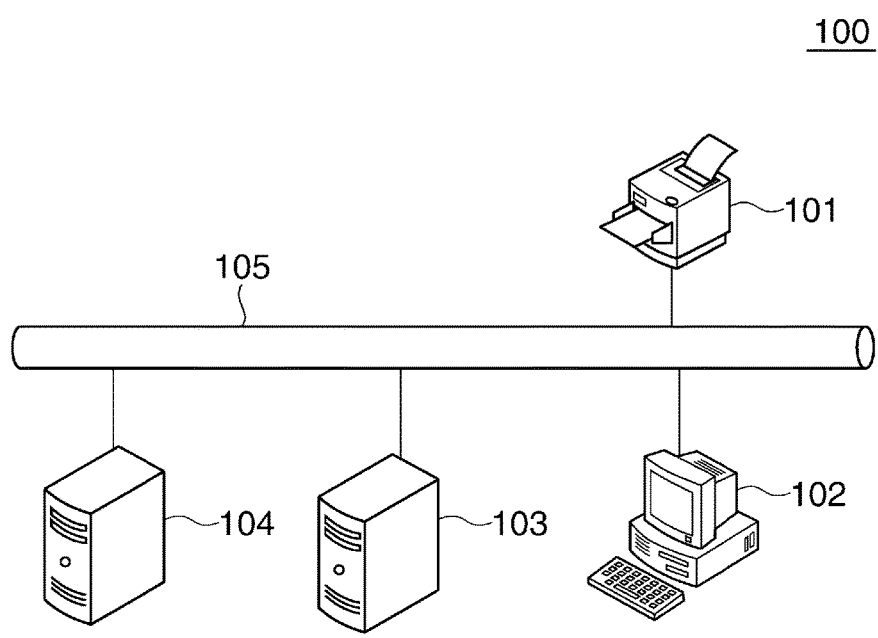
FIG. 1 is a schematic block diagram of a communication system including an MFP as an information processing apparatus according to a first embodiment of the invention.

FIG. 1 is a schematic block diagram of a communication system 100 including an MFP 101 as an information processing apparatus according to a first embodiment of the invention.

Referring to FIG. 1, the communication system 100 includes the MFP 101 (information processing apparatus), a client PC 102 (client apparatus), a DNS server 103, and a DHCP server 104, which are interconnected via a LAN 105. The MFP 101 is equipped with various functions, such as a print function, a copy function, a scan function, and an SSL server certificate-issuing function, and is capable of performing network communication with the client PC 102, the DNS server 103, and the DHCP server 104, which are connected via the LAN 105. In the present embodiment, the MFP 101 issues the SSL server certificate as a self-certificate of the MFP 101, and the SSL server certificate includes a common name (identifying information) for identifying the MFP 101 as a self-certifying object. Various settings for issuing the SSL server certificate are made using a console panel 204, described hereinafter, provided on the MFP 101, or using the client PC 102. The SSL server certificate is used when the MFP 101 performs SSL communication for communicating encrypted data via the LAN 105. The client PC 102 performs HTTP communication with the MFP 101 using URL information including identification information for identifying the MFP 101. Further, the client PC 102 sends a request notification for requesting execution of SSL communication to the MFP 101, and acquires the SSL server certificate transmitted from the MFP 101 in response to the request notification, and when the common name included in the acquired SSL server certificate matches the identification information of the MFP 101, the client PC 102 performs SSL communication with the MFP 101. When performing LAN communication with various apparatuses connected to the LAN 105, the DHCP server 104 assigns, to each of the various apparatuses, identification information for identifying the apparatus, for example, a host name, a domain name, and an IP address. The DNS server 103 associates the host name, the domain name, and the IP address, assigned by the DHCP server 104, with the apparatus.

Figure 2:
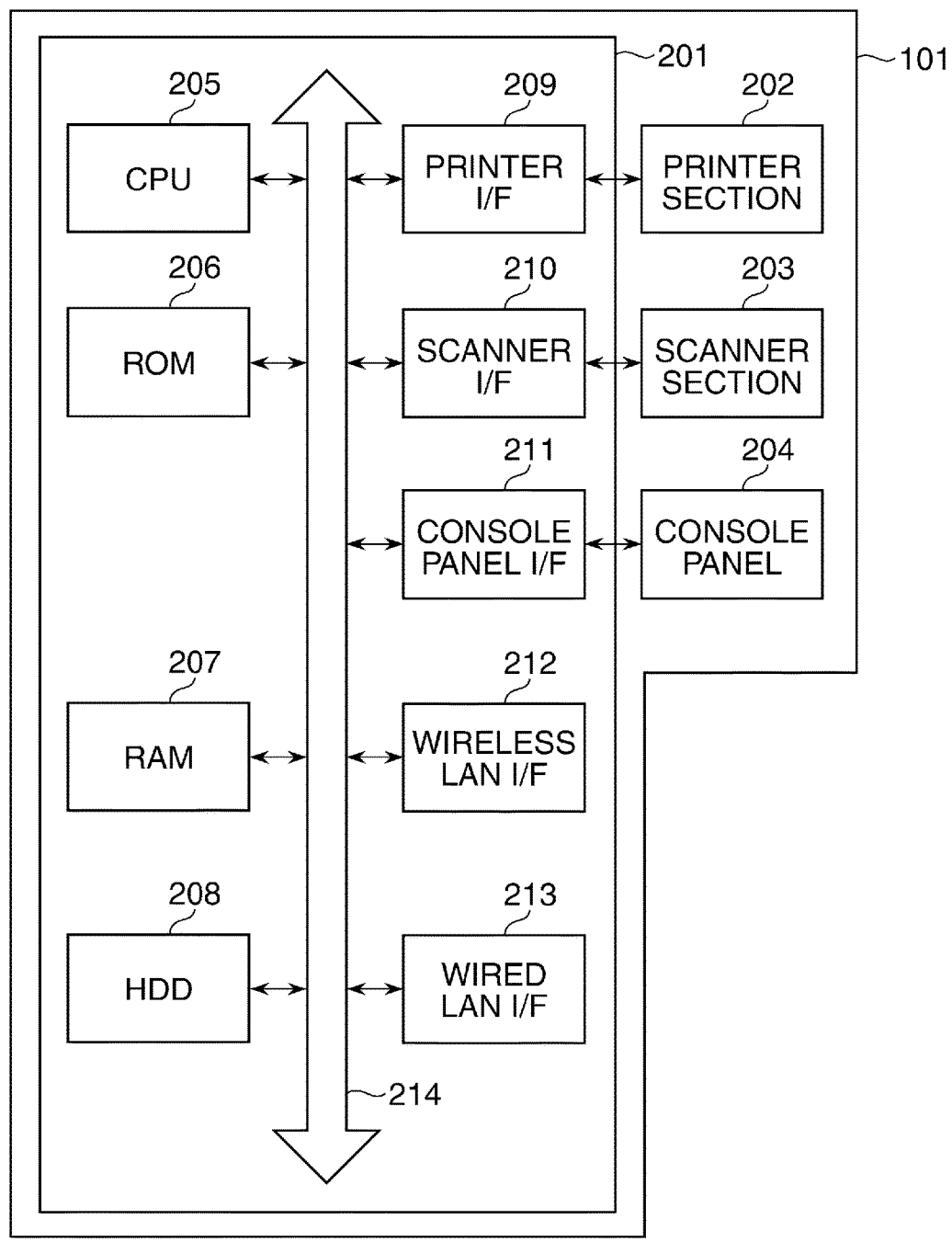
FIG. 2 is a schematic block diagram of hardware of the MFP appearing in FIG. 1.

FIG. 2 is a schematic block diagram of hardware of the MFP 101 appearing in FIG. 1.

Referring to FIG. 2, the MFP 101 includes a controller 201, a printer section 202, a scanner section 203, and the console panel 204, and the controller 201 is connected to the printer section 202, the scanner section 203, and the console panel 204. The controller 201 includes a CPU 205, a ROM 206, a RAM 207, an HDD 208, a printer interface 209, a scanner interface 210, a console panel interface 211, a wireless LAN interface 212, and a wired LAN interface 213. These components are interconnected via a system bus 214.

The controller 201 controls the overall operation of the MFP 101. The CPU 205 controls each of the components connected to the system bus 214. In the present embodiment, the CPU 205 performs software modules 300 described hereinafter with reference to FIG. 3, by executing control programs stored in the ROM 206 and the HDD 208, to thereby control the components connected to the system bus 214. The RAM 207 is used as a main memory and a work area for the CPU 205. In the present embodiment, the controller 201 may be provided with a plurality of CPUs and a plurality of RAMS, and perform various processes using these CPUs and RAMS. The HDD 208 stores various data, various programs, and various information tables. The printer interface 209 communicates with the printer section 202. The scanner interface 210 communicates with the scanner section 203. The console panel interface 211 communicates with the console panel 204. The wireless LAN interface 212 performs wireless communication with each of client apparatuses, such as the client PC 102 and a mobile terminal, not shown, in response to a notification sent from the CPU 205 for performing wireless communication. The wired LAN interface 213 performs wired communication with each of the client PC 102 and the like connected to the LAN 105 in response to a notification sent from the CPU 205 for performing wired communication via the LAN 105. The wireless LAN interface 212 and the wired LAN interface 213 communicate execution data for executing various processes e.g. to and from the client PC 102. Further, the wireless LAN interface 212 and the wired LAN interface 213 transmit Web pages to the client PC 102, for causing a display section, not shown, of the client PC 102 to display various items of Web information.

The printer section 202 performs print processing on a sheet fed from a sheet feed cassette, no shown, based on the execution data acquired via the printer interface 206. The scanner section 203 reads an original placed on an original platen glass, not shown, by performing scan processing, to thereby acquire image information and generate image data based on the acquired image information. The console panel 204 is a user interface unit used by a user so as to operate the MFP 101. In the present embodiment, for example, a user operates the console panel 204 to make a setting for issuing an SSL server certificate, a setting for giving priority to which of communication using the wireless LAN interface 212 and communication using the wired LAN interface 213 (hereinafter referred to as the "interface priority setting"), and so forth.

Figure 3:
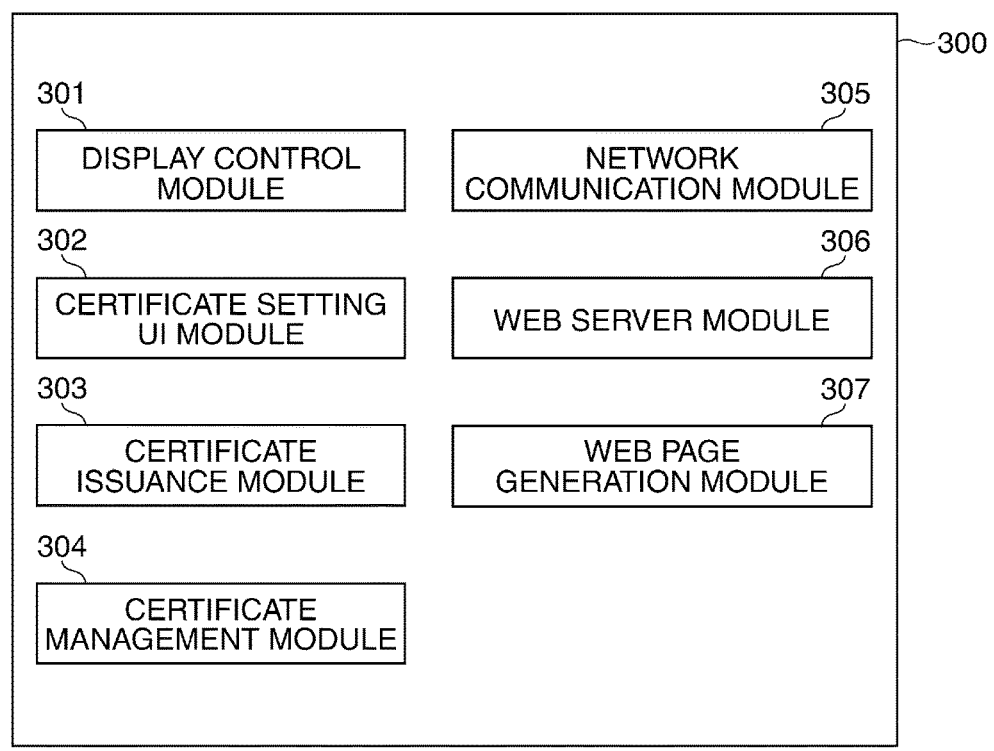
FIG. 3 is a schematic block diagram of software modules executed by a CPU appearing in FIG. 2.

FIG. 3 is a schematic block diagram of the software modules 300 executed by the CPU 205 appearing in FIG. 2.

Referring to FIG. 3, the software modules 300 include a display control module 301, a certificate setting UI module 302, a certificate issuance module 303, a certificate management module 304, a network communication module 305, a Web server module 306, and a Web page generation module 307.

The display control module 301 displays a setting menu on the console panel 204, including setting items and setting fields associated with the setting items, respectively, for enabling the user to configure various settings. In the present embodiment, the display control module 301 displays on the console panel 204 a certificate setting menu 600, described hereinafter with reference to FIG. 6, which is used when generating information for issuing an SSL server certificate (hereinafter referred to as the "certificate setting information"). The certificate setting UI module 302 generates display data for displaying the certificate setting menu 600 or the like on the console panel 204. The certificate issuance module 303 issues the SSL server certificate of the MFP 101 based on the set certificate setting information. The certificate management module 304 manages the SSL server certificate of the MFP 101, which has been issued by the certificate issuance module 303. The network communication module 305 controls wireless communication using the wireless LAN interface 212 and wired communication using the wired LAN interface 213. Further, the network communication module 305 manages various settings of the DNS server 103, and manages the setting statuses of an FQDN and an mDNS name, described hereinafter, for performing wireless communication and wired communication. The Web server module 306 controls the Web page generation module 307. The Web page generation module 307 generates Web pages for displaying Web information e.g. on the display section of the client PC 102 using HTTP communication and SSL communication. In the present embodiment, when settings for issuing the SSL server certificate of the MFP 101 are made from the client PC 102, the Web page generation module 307 generates a certificate setting Web page for displaying the certificate setting menu 600, described hereinafter, on the client PC 102. Further, when a certificate signing request (CSR) for requesting the issuance of an SSL server certificate (hereinafter referred to as "certified SSL server certificate") from a certification authority or the like for certifying SSL server certificates is sent from the MFP 101, the Web page generation module 307 generates certificate setting transmission data to be transmitted to the certification authority.

Figure 4:
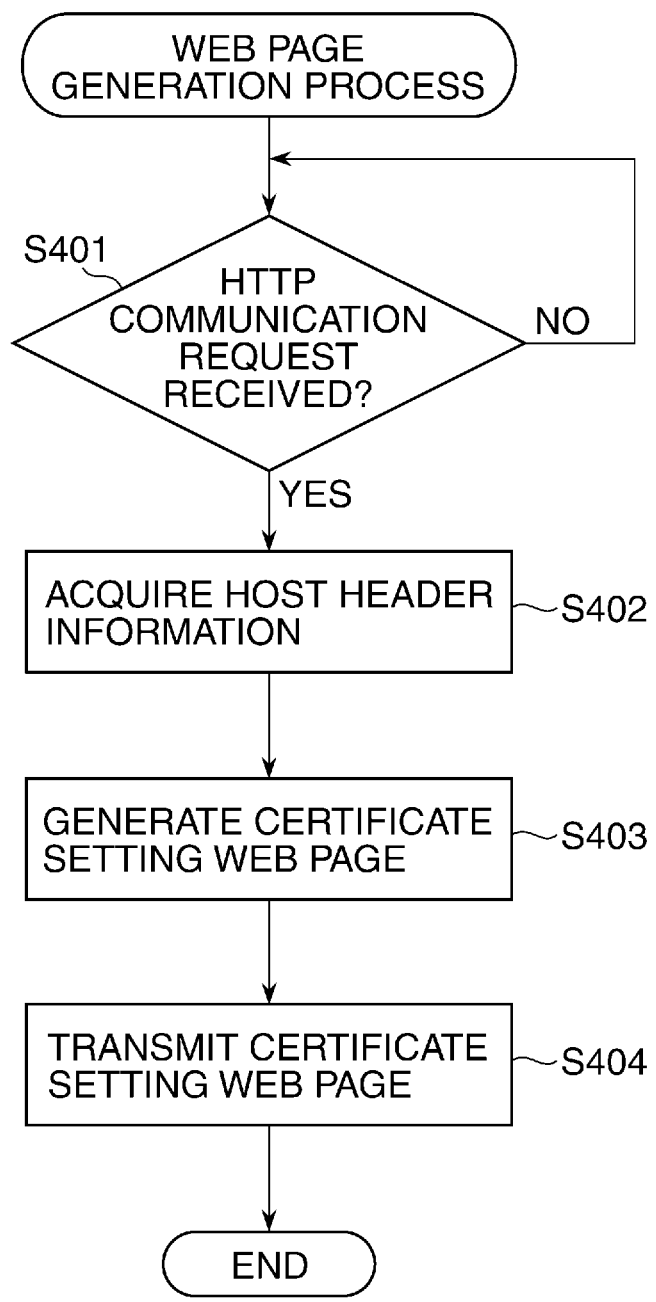
FIG. 4 is a flowchart of a certificate Web page generation process performed by the MFP appearing in FIG. 1.

FIG. 4 is a flowchart of a Web page generation process performed by the MFP 101 appearing in FIG. 1.

The Web page generation process in FIG. 4 is performed by the CPU 205 that executes the control programs stored in the ROM 206 and the HDD 208.

Here, when SSL communication is performed between the MFP 101 and the client PC 102, a common name included in the SSL server certificate and identification information of the MFP 101 included in URL information used when the client PC 102 communicates with the MFP 101 are required to correspond to each other, e.g. to match each other, but there is a case where a proper common name is not set e.g. due to a user's erroneous input of the certificate setting information for issuing the SSL server certificate.

To eliminate such an inconvenience, in the Web page generation process in FIG. 4, common name information 601, described hereinafter, corresponding to the common name of the SSL server certificate is set in the certificate setting information, based on the identification information of the MFP 101, which is included in URL information used for network communication. Note that the Web page generation process in FIG. 4 is performed assuming that the certificate setting information is set by the client PC 102.

Figure 5:
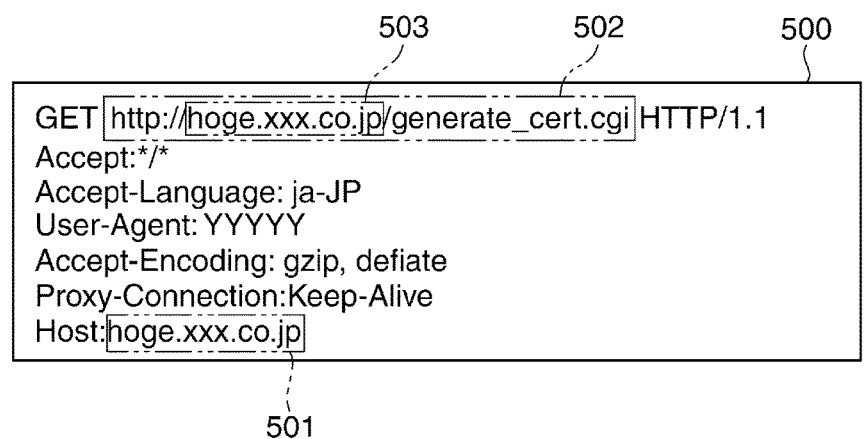
FIG. 5 is a diagram useful in explaining an HTTP communication request transmitted from a client PC appearing in FIG. 1.

Referring to FIG. 4, first, the CPU 205 receives from an apparatus capable of performing HTTP communication, for example, the client PC 102, an HTTP communication request 500, shown in FIG. 5, for requesting execution of HTTP communication, and when the CPU 205 receives the HTTP communication request 500 (YES to a step S401) (the operation of a reception unit). As shown in FIG. 5, the HTTP communication request 500 includes host header information 501 (identification information) (e.g. "hoge.xxx.co.jp") for identifying the MFP 101 which is a destination to which execution of HTTP communication is requested by the client PC 102, and URL information 502 (e.g. "http://hoge.xxx.co.jp/generate_cert.cgi") used for HTTP communication with the MFP 101. The URL information 502 includes host information 503 (e.g. "hoge.xxx.co.jp") for identifying the MFP 101, and the host information 503 corresponds to, for example, matches the host header information 501.

Then, the CPU 205 executes the Web page generation module 307, and acquires the host header information 501 from the HTTP communication request 500 (step S402) (the operation of an acquisition unit). Although in the present embodiment, the host header information 501 included in the HTTP communication request 500 is used as the information for identifying the MFP 101, since the host information 503 corresponds to the host header information 501, the host information 503 may be used as the information for identifying the MFP 101.

Then, the CPU 205 generates the certificate setting Web page (Web page for issuing a certificate) based on the acquired host header information 501 (step S403). In the present embodiment, there is generated such a certificate setting Web page as one in which "hoge.xxx.co.jp" corresponding to the host header information 501 is set as an initial value (default value) of the common name information 601 in the certificate setting menu 600 (operation of a generation unit). More specifically, the generated certificate setting Web page includes <input type=value="hoge.xxx.co.jp"> in which "hoge.xxx.co.jp" is set as the initial value of the common name information 601.

Then, the CPU 205 transmits the generated certificate setting Web page to the client PC 102 (step S404) (operation of a transmission unit). The client PC 102 displays on the display section thereof the certificate setting menu 600 on which "hoge.xxx.co.jp" corresponding to the host header information 501 is set based on the received certificate setting Web page as the initial value of the common name information 601. The CPU 205 terminates the present process after executing the step S404.

As described above, the user sets the certificate setting information using the displayed certificate setting menu 600. The certificate setting menu 600 includes "hoge.xxx.co.jp" corresponding to the host header information 501 as the initial value of the common name information 601, and hence the user can easily set "hoge.xxx.co.jp" corresponding to the host header information 501 as the common name in the certificate setting information.

According to the Web page generation process in FIG. 4, the host header information 501 for identifying the MFP 101, which is included in the HTTP communication request 500 for requesting execution of HTTP communication, is set as the initial value of the common name information 601 included in the certificate setting menu 600 for use in setting the certificate setting information. Here, although when SSL communication is performed between the MFP 101 and the client PC 102, the common name information 601 included in the SSL server certificate and the host header information 501 for identifying the MFP 101 are required to correspond to each other, the initial value of the common name information 601 is set based on the host header information 501 and is displayed to the user, and hence it is possible to prevent the user from setting information which does not correspond to the host header information 501 as the common name information 601. This makes it possible to prevent the common name information 601 from not corresponding to the host header information 501 when the setting of the certificate setting information is made by the user. As a result, it is possible to generate the SSL server certificate based on the certificate setting information in which the common name information 601 corresponding to the host header information 501 is set, which in turn makes it possible to perform SSL communication.

Next, a description will be given of a second embodiment of the invention.

The second embodiment is basically the same in configuration and operation as the above-described first embodiment, and is different from the first embodiment in that the setting of the certificate setting information is performed from the console panel 204 of the MFP 101. Accordingly, the following description will be given only of different points from the first embodiment while omitting redundant description of the same configuration and operation.

Figure 7:
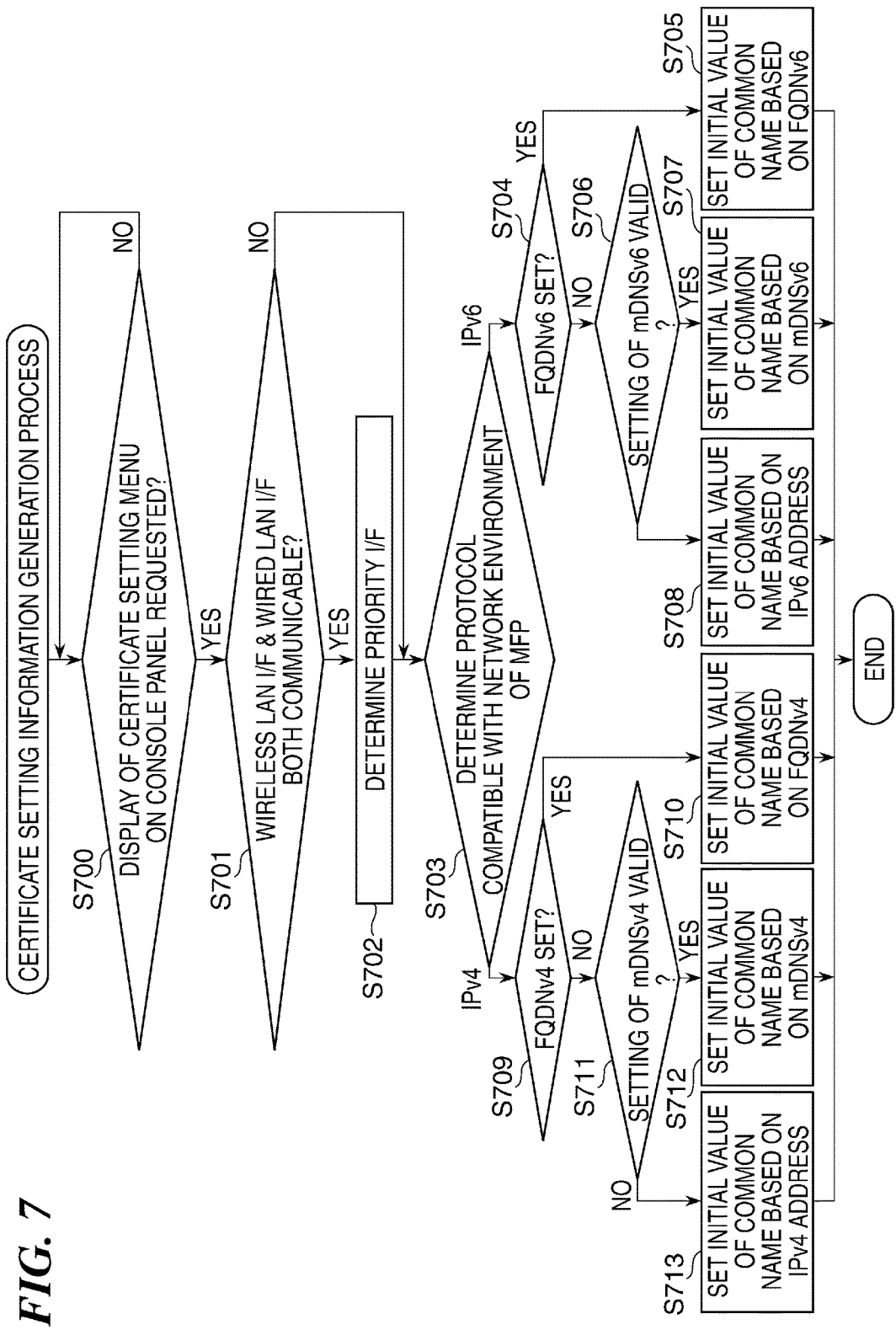
FIG. 7 is a flowchart of a certificate setting information generation process performed by an MFP as an information processing apparatus according to a second embodiment of the invention.

FIG. 7 is a flowchart of a certificate setting information generation process performed by the MFP 101 as an information processing apparatus according to the second embodiment.

Here, in the above-described first embodiment, assuming that the SSL communication destination is the client PC 102 in which the certificate setting information has been set, the common name corresponding to the identification information of the MFP 101 to be used by the client PC 102 is set. However, in a case where the SSL communication destination is indefinite, even if the above-described first embodiment is applied, the common name and the identification information of the MFP 101 as the SSL communication destination do not necessarily correspond to each other, and hence it is sometimes impossible to perform SSL communication.

To eliminate this inconvenience, in the certificate setting information generation process in FIG. 7, the common name information 601 included in the certificate setting information for issuing the SSL server certificate is set based on network setting information 800, described hereinafter.

The certificate setting information generation process in FIG. 7 is performed by the CPU 205 that executes the control programs stored in the ROM 206 and the HDD 208. Note that the certificate setting information generation process in FIG. 7 is performed assuming that the certificate setting information is set from the console panel 204.

Referring to FIG. 7, first, when the display of the certificate setting menu 600 on the console panel 204 is requested (YES to a step S700), the CPU 205 determines whether or not both of the wireless LAN interface 212 and the wired LAN interface 213 are in a communicable state (step S701).

If it is determined in the step S701 that one of the wireless LAN interface 212 and the wired LAN interface 213 is in the communicable state, the CPU 205 proceeds to a step S703 without executing a step S702.

If it is determined in the step S701 that both of the wireless LAN interface 212 and the wired LAN interface 213 are in the communicable state, the CPU 205 determines one of the wireless LAN interface 212 and the wired LAN interface 213 as a priority interface to which the priority of communication is given (step S702). In the present embodiment, the priority interface is determined based on the interface priority setting set by a user's operation on the console panel 204 in advance.

Then, the CPU 205 executes the certificate setting UI module 302, and acquires the network setting information 800 shown in FIG. 8, which corresponds to the priority interface. The network setting information 800 includes the host name, the domain name, and the IP address for identifying the MFP 101 when the MFP 101 performs communication, and one of these information items is used, as the identification information of the MFP 101, for the URL information for performing communication with the MFP 101. Then, the CPU 205 determines from the acquired network setting information 800 an Internet Protocol which is compatible with a network environment in which the MFP 101 performs communication (step S703). In general, one of IPv4 (Internet Protocol version 4) and IPv6 (Internet Protocol version 6) is used as the Internet Protocol. In the present embodiment, the CPU 205 determines, one of IPv4 and IPv6, in which values of settings thereof are set in the network setting information 800, as the Internet Protocol which is compatible with the above-mentioned network environment. For example, if values of settings of IPv6 are set therein, the CPU 205 judges that IPv6 is the Internet Protocol compatible with the network environment, whereas if only values of settings of IPv4 are set therein, the CPU 205 judges that IPv4 is the Internet Protocol compatible with the network environment.

If it is determined in the step S703 that the compatible Internet Protocol is IPv6, the CPU 205 determines whether or not information for FQDNv6 is set in the network setting information 800 (step S704). FQDNv6 is set based on the IPv6 host name and the IPv6 domain name of the network setting information shown in FIG. 8.

If it is determined in the step S704 that FQDNv6 is set, there is a high possibility that the network environment of the MFP 101 is compatible with communication using FQDNv6, and hence the CPU 205 judges that communication using FQDNv6 is to be performed, and sets an initial value of the common name information 601 of the certificate setting information based on FQDNv6 (step S705). Although as URL information used for performing communication with the MFP 101, not only an FQDN (FQDNv4 or FQDNv6) and an IP address (IPv4 address or IPv6 address) for identifying the MFP 101, but also an mDNS name (mDNSv4 or mDNSv6 name) for identifying the MFP 101 is used, in general, the FQDN and the mDNS name which enable the user to visually and easily identify the MFP 101 are more widely used than the IP address. Further, in general, the FQDN in which a host name and a domain name assigned from the DNS server can be directly used is more widely used than the mDNS name which adds information, such as ".local", to the host name and the domain name. That is, it is preferable that the priority of URL information to be used is in the order of an FQDN, an mDNS name, and an IP address. Accordingly, in the present embodiment, processing for determining the setting information is performed for an FQDN, an mDNS name, and an IP address in the mentioned order. After executing the step S705, the CPU 205 terminates the present process.

If it is determined in the step S704 that FQDNv6 is not set, there is a high possibility that the network environment of the MFP 101 is incompatible with communication using FQDNv6, and hence the CPU 205 judges that communication using FQDNv6 is not to be performed and determines whether or not the setting of mDNSv6 is valid (step S706). In the present embodiment, whether or not the setting of mDNSv6 is valid is determined based on the setting of mDNSv6 managed by the network communication module 305.

If it is determined in the step S706 that the setting of mDNSv6 is valid, there is a high possibility that the network environment of the MFP 101 is compatible with communication using mDNSv6, and hence the CPU 205 judges that communication using mDNSv6 is to be performed and sets the initial value of the common name information 601 of the certificate setting information based on mDNSv6 (step S707), followed by terminating the present process.

If it is determined in the step S706 that the setting of mDNSv6 is not valid, there is a high possibility that the network environment of the MFP 101 is incompatible with communication using mDNSv6, and hence the CPU 205 judges that communication using mDNSv6 is not to be performed and sets the initial value of the common name information 601 of the certificate setting information based on the IPv6 address (step S708), followed by terminating the present process.

If it is determined in the step S703 that the compatible Internet Protocol is IPv4, the CPU 205 determines whether or not FQDNv4 is set in the network setting information 800 (step S709). FQDNv4 is set based on the IPv4 host name and the IPv4 domain name of the network setting information shown in FIG. 8.

If it is determined in the step S709 that FQDNv4 is set, there is a high possibility that the network environment of the MFP 101 is compatible with communication using FQDNv4, and hence the CPU 205 judges that communication using FQDNv4 is to be performed and sets the initial value of the common name information 601 of the certificate setting information based on FQDNv4 (step S710), followed by terminating the present process.

If it is determined in the step S709 that FQDNv4 is not set, there is a high possibility that the network environment of the MFP 101 is incompatible with communication using FQDNv4, and hence the CPU 205 judges that communication using FQDNv4 is not to be performed and determines whether or not the setting of mDNSv4 is valid (step S711). In the present embodiment, whether or not the setting of mDNSv4 is valid is determined based on the setting of mDNSv4 managed by the network communication module 305.

If it is determined in the step S711 that the setting of mDNSv4 is valid, there is a high possibility that the network environment of the MFP 101 is compatible with communication using mDNSv4, and hence the CPU 205 judges that communication using mDNSv4 is to be performed and sets the initial value of the common name information 601 of the certificate setting information based on mDNSv4 (step S712), followed by terminating the present process.

If it is determined in the step S711 that the setting of mDNSv4 is not valid, there is a high possibility that the network environment of the MFP 101 is incompatible with communication using mDNSv4, and hence the CPU 205 judges that communication using mDNSv4 is not to be performed and sets the initial value of the common name information 601 of the certificate setting information based on the IPv4 address (step S713), followed by terminating the present process.

Although in the present embodiment, the user sets the certificate setting information using the certificate setting menu 600 displayed on the console panel 204, the FQDN, the IP address, or the mDNS for identifying the MFP 101 (hereinafter referred to as the "the FQDN, IP address or mDNS of the MFP 101") included in the network setting information 800 is set as the initial value of the common name information 601 in the certificate setting menu 600, and hence the user can easily set the FQDN, IP address or mDNS of the MFP 101 as the common name in the certificate setting information.

According to the certificate setting information generation process in FIG. 7, the FQDN, IP address or mDNS of the MFP 101 included in the network setting information 800 is set as the initial value of the common name information 601 included in the certificate setting information for issuing the SSL server certificate. As a result, even when the destination of SSL communication is indefinite, it is possible to prevent the common name information 601 from not corresponding to the FQDN, IP address or mDNS of the MFP 101, which is the identification information of the MFP 101, which makes it possible to generate the SSL server certificate based on the certificate setting information in which the common name information 601 corresponding to the network setting information 800 is set, which in turn makes it possible to perform SSL communication.

In the above-described Web page generation process in FIG. 4 and the certificate setting information generation process in FIG. 7, when requesting the issuance of a certified SSL server certificate from the certification authority, the certificate setting information including the common name information 601 may be transmitted (operation of a transmission unit) to an apparatus for issuing certified SSL server certificates or the like (certificate issuing apparatus), which is managed by the certification authority, and the apparatus may issue the certified SSL server certificate based on the received certificate setting information. With this, even in a case where the certified SSL server certificate is issued by the certification authority, the common name information 601 included in the certificate setting information for issuing the certified authenticated SSL server certificate is made correspondent to the host header information 501 for identifying the MFP 101 or the FQDN, IP address, or mDNS of the MFP 101, which makes it possible to perform SSL communication.

In the above-described certificate setting information generation process in FIG. 7, in the case where there are a plurality of candidates to be set in the common name information 601, for example, not only the host header information 501, but also the FQDN, IP address or mDNS of the MFP 101, the plurality of candidates may be displayed in the setting field of the common name information 601 of the certificate setting information in a manner selectable by a user, and the candidate selected by the user out of the plurality of candidates may be set as the common name information 601. This makes it possible to easily reflect the intention of selection of the user concerning the certificate setting information on the common name information 601.

Further, in the certificate setting information generation process described above with reference to FIG. 7, out of the plurality of candidates, a setting which is not set as the common name information 601 may be set as a subject alternative name which is other identifying information for identifying the MFP 101. SSL communication can be performed also based on the subject alternative name, and hence even in a case where it is impossible to perform confirmation or the like of correspondence between the common name information 601 and the identification information of the MFP 101, it is possible to perform SSL communication by using the subject alternative name.

Next, a description will be given of a third embodiment of the invention.

The third embodiment is basically the same in configuration and operation as the above-described second embodiment, and is different from the first and second embodiments in that a warning notification is displayed in a case where the common name information 601 and the network setting information 800 do not correspond to each other. Therefore, the following description will be given only of different points from the first and second embodiments while omitting redundant description of the same configuration and operation.

Figure 9:
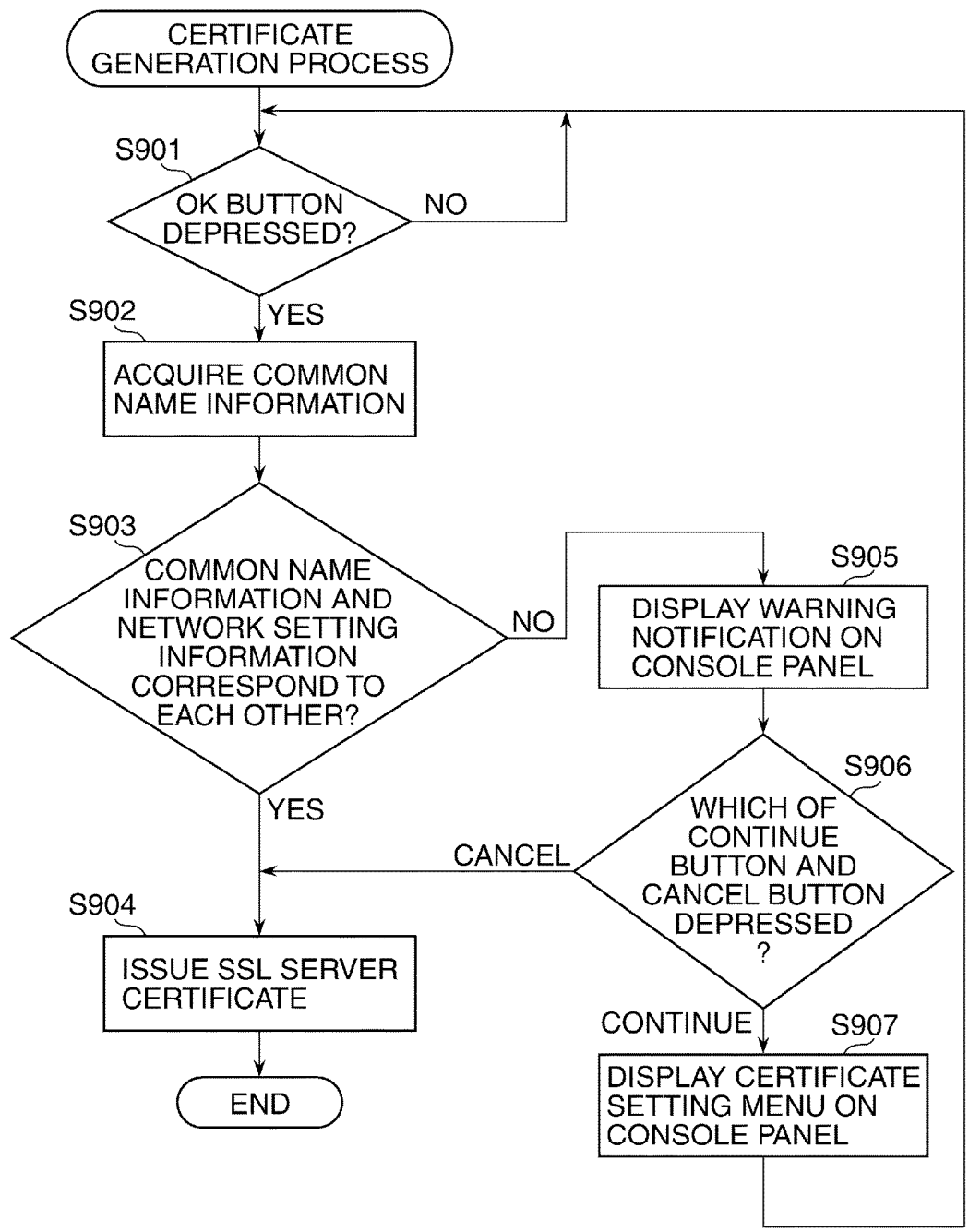
FIG. 9 is a flowchart of a certificate generation process performed by an MFP as an information processing apparatus according to a third embodiment of the invention.

FIG. 9 is a flowchart of a certificate generation process performed by the MFP 101 as an information processing apparatus according to the third embodiment.

Here, there is a case where the common name information 601 of the certificate setting information set in the second embodiment is reset by a user, but in this case, a proper common name is sometimes not set e.g. due to a user's erroneous input of the certificate setting information.

Figure 10:
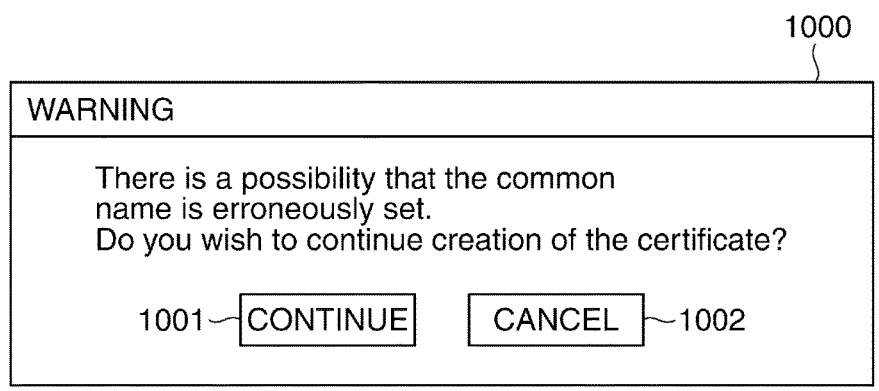
FIG. 10 is a diagram useful in explaining a warning notification displayed on the console panel appearing in FIG. 2.

To eliminate this inconvenience, in the present embodiment, when the network setting information 800 used for network communication and the common name information 601 included in the certificate setting information do not correspond to each other, a warning notification 1000 described hereinafter with reference to FIG. 10 is displayed on the console panel 204.

The certificate generation process in FIG. 9 is performed by the CPU 205 that executes the control programs stored in the ROM 206 and the HDD 208.

Referring to FIG. 9, first, when an OK button 602 for instructing the issuance of the SSL server certificate is depressed on the certificate setting menu 600 displayed on the console panel 204 (YES to a step S901), the CPU 205 acquires the common name information 601 set in the certificate setting menu 600 before starting processing for issuing the SSL server certificate (step S902). Then, the CPU 205 acquires the network setting information 800, and determines whether or not the common name information 601 and the FQDN, IP address or mDNS of the MFP 101 in the network setting information 800 correspond to each other (step S903). In the present embodiment, not only the network setting information 800, but also various information used for performing network communication, acquired from the DNS server 103, may be used.

If it is determined in the step S903 that the common name information 601 and the FQDN, IP address or mDNS of the MFP 101 in the network setting information 800 correspond to each other, the CPU 205 performs processing for issuing the SSL server certificate based on the certificate setting information set in the certificate setting menu 600 to issue the SSL server certificate of the MFP 101 (step S904), followed by terminating the present process.

If it is determined in the step S903 that the common name information 601 and the FQDN, IP address or mDNS of the MFP 101 in the network setting information 800 do not correspond to each other, the CPU 205 displays the warning notification 1000 shown in FIG. 10 on the console panel 204 (step S905). The warning notification 1000 displays a message to the effect that there is a possibility of erroneous setting of the common name information 601, a continue button 1001 for performing resetting of the certificate setting information, and a cancel button 1002 for not performing resetting of the certificate setting information. Then, the CPU 205 determines which of the continue button 1001 and the cancel button 1002 has been depressed (step S906).

If it is determined in the step S906 that the continue button 1001 has been depressed, the CPU 205 displays the certificate setting menu 600 on the console panel 204 (step S907). This enables the common name information 601 to be reset. Then, the CPU 205 returns to the step S901 after executing the step S907.

If it is determined in the step S906 that the cancel button 1002 has been depressed, the CPU 205 executes the step S904 without resetting the common name information 601, followed by terminating the present process.

According to the above-described certificate generation process in FIG. 9, when the FQDN, IP address or mDNS of the MFP 101 in the network setting information 800 and the common name information 601 included in the certificate setting information do not correspond to each other, the warning notification 1000 is displayed on the console panel 204. Although SSL communication in the present embodiment is performed on condition that the common name information 601 included in the certificate setting information corresponds to the FQDN, IP address or mDNS of the MFP 101 in the network setting information 800, by thus displaying the warning notification 1000, it is possible to prevent the common name information 601 from not corresponding to the FQDN, IP address or mDNS of the MFP 101 in the network setting information 800, which in turn makes it possible to perform SSL communication.

Next, a description will be given of a fourth embodiment of the invention.

The fourth embodiment is basically the same in configuration and operation as the above-described second and third embodiments, and is different from the second and third embodiments in that a warning notification is displayed on the console panel 204 in a case where the network setting information 800 and the common name included in the SSL server certificate do not correspond to each other. Therefore, the following description will be given only of different points from the second and third embodiments while omitting redundant description of the same configuration and operation.

Figure 11:
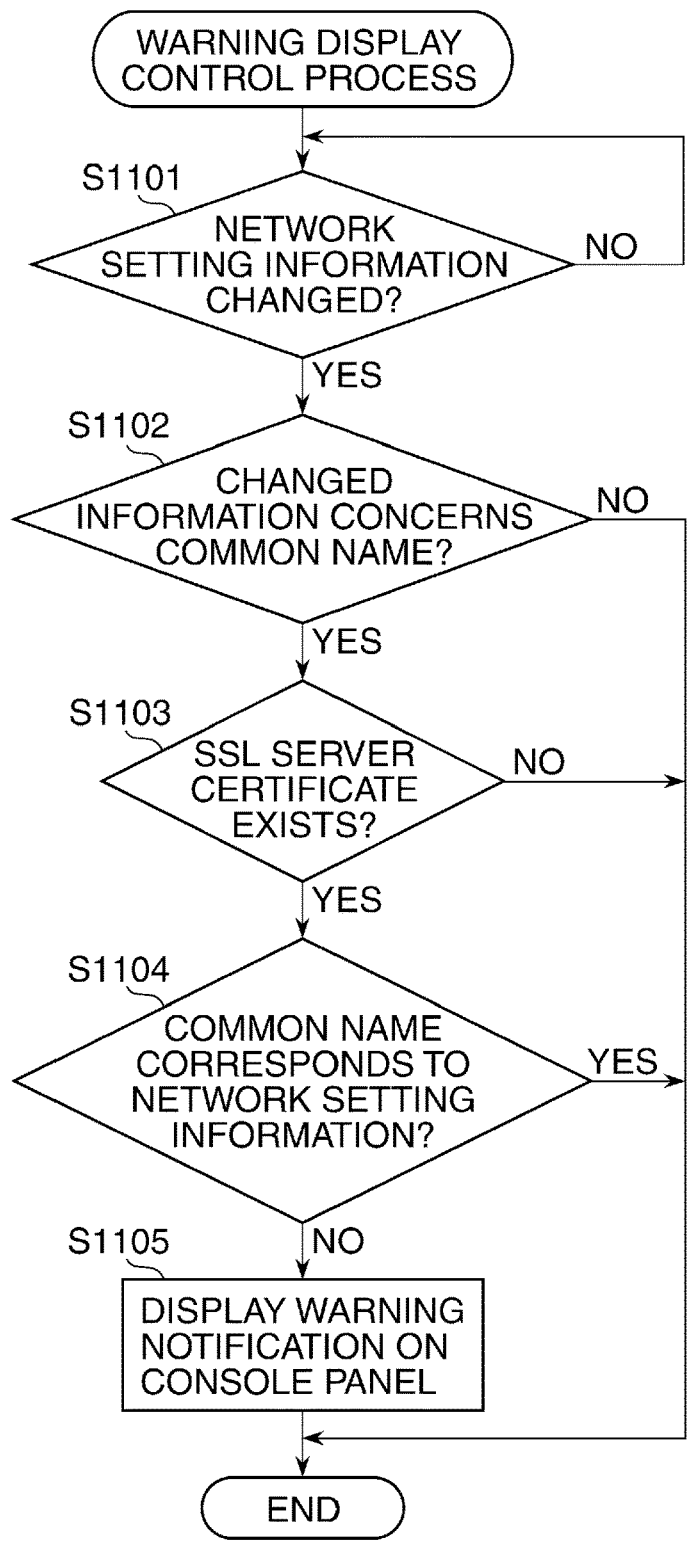
FIG. 11 is a flowchart of a warning display control process performed by an MFP as an information processing apparatus according to a fourth embodiment of the invention.

FIG. 11 is a flowchart of a warning display control process performed by the MFP 101 as an information processing apparatus according to the fourth embodiment.

Here, even when the common name information 601 corresponds to the network setting information 800 when issuing the SSL server certificate, if information corresponding to the SSL server certificate in the network setting information 800 is changed after issuing the SSL sever certificate, the common name is also changed, and hence it becomes impossible to perform SSL communication using the issued SSL server certificate.

To eliminate this inconvenience, in the present embodiment, when the network setting information 800 and the common name included in the SSL server certificate do not correspond to each other, a warning notification 1201 shown in FIG. 12, referred to hereinafter, is displayed on the console panel 204.

The warning display control process in FIG. 11 is performed by the CPU 205 that executes the control programs stored in the ROM 206 and the HDD 208.

Referring to FIG. 11, first, when it is detected that the network setting information 800 has been changed (YES to a step S1101), the CPU 205 determines whether or not the changed information is information concerning the common name (step S1102). The information concerning the common name refers specifically to the IPv4 address, the IPv4 host name, the IPv4 domain name, the IPv6 address, the IPv6 host name, and the IPv6 domain name, i.e. the FQDN, the mDNS name, and the IP address. In the present embodiment, if any of the FQDN, the mDNS name, and the IP address is changed, the CPU 205 determines that the changed information is the information concerning the common name. On the other hand, if none of the FQDN, the mDNS name, and the IP address is changed, the CPU 205 determines that the changed information is not the information concerning the common name.

If it is determined in the step S1102 that the changed information is the information concerning the common name, the CPU 205 determines whether or not the SSL server certificate exists (step S1103).

If it is determined in the step S1103 that the SSL server certificate exists, the CPU 205 acquires the common name included in the SSL server certificate, and determines whether or not the acquired common name corresponds to the FQDN, IP address or mDNS of the MFP 101 in the network setting information 800 (step S1104).

Figure 12:
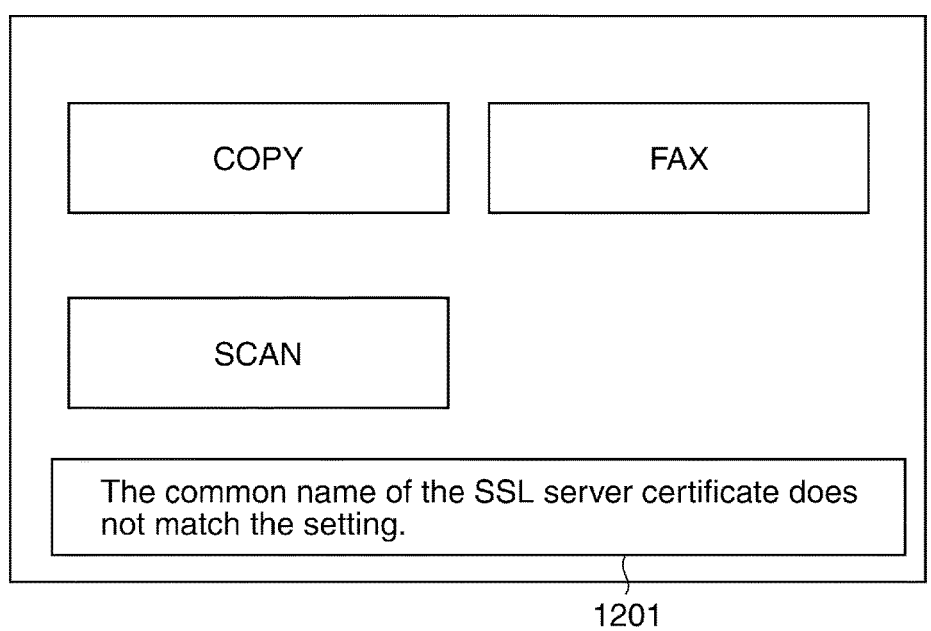
FIG. 12 is a diagram useful in explaining a warning notification displayed on the console panel appearing in FIG. 2.

If it is determined in the step S1104 that the acquired common name does not correspond to the FQDN, IP address or mDNS of the MFP 101 in the network setting information 800, the CPU 205 displays the warning notification 1201, shown in FIG. 12, to the effect that the common name in the SSL server certificate does not match the setting, on the console panel 204 (step S1105), followed by terminating the present process.

If it is determined in the step S1102 that the changed information is not the information concerning the common name, if it is determined in the step S1103 that the SSL server certificate does not exist, or if it is determined in the step S1104 that the acquired common name corresponds to the FQDN, IP address or mDNS of the MFP 101 in the network setting information 800, the CPU 205 terminates the present process.

According to the above-described warning display control process in FIG. 11, when the FQDN, IP address or mDNS of the MFP 101 in the network setting information 800 and the common name included in the SSL server certificate do not correspond to each other, the warning notification 1201 is displayed. Although SSL communication is performed on condition that the common name included in the SSL server certificate corresponds to the FQDN, IP address or mDNS of the MFP 101 in the network setting information 800, by thus displaying the warning notification 1201, it is possible to prevent the common name from not corresponding to the FQDN, IP address or mDNS of the MFP 101 in the network setting information 800, which in turn makes it possible to perform SSL communication.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-004927 filed Jan. 14, 2015, which is hereby incorporated by reference herein in its entirety.

What is claimed is:

1. An image forming apparatus as an SSL server configured to issue an SSL server certificate to perform SSL communication, the image forming apparatus having a print unit, the image forming apparatus comprising:
   a memory configured to store instructions; and
   at least one processor configured to execute the instructions stored in memory to:
      receive, from a client apparatus, an acquisition request for acquiring a Web page, the Web page being a setting page for inputting SSL server certificate settings, the acquisition request comprising an HTTP communication request for requesting execution of HTTP communication and including host information for identifying the image forming apparatus;
      extract identification information of at least the image forming apparatus from the HTTP communication request;
      transmit the Web page for inputting the SSL server certificate settings with the extracted identification information as an initial value of a common name for the SSL server certificate to be issued, to the client apparatus as a response of the HTTP communication request, in a case where the HTTP communication request is received;
      receive, from the client apparatus, an issuance request for issuing, based on the SSL server certificate settings inputted via the Web page, a SSL server certificate of the image forming apparatus; and
      issue the SSL server certificate for use in performing the SSL communication between the image forming apparatus and the client apparatus and transmit the issued SSL server certificate to the client apparatus.

2. The image forming apparatus according to claim 1, wherein the at least one processor is further configured to execute instructions stored in the memory to:
   extract the identification information of the image forming apparatus from a host header of the HTTP communication request.

3. The image forming apparatus according to claim 1, wherein the at least one processor is further configured to execute instructions stored in the memory to:
extract, as the identification information, a host portion of an URL included in the HTTP communication request.

4. The image forming apparatus according to claim 1, wherein the identification information of the image forming apparatus includes an IP address.

5. The image forming apparatus according to claim 1, wherein the identification information of the image forming apparatus includes a Fully Qualified Domain Name(FQDN).

6. The image forming apparatus according to claim 1, wherein a plurality of types of identification information including an IP address or a Fully Qualified Domain Name (FQDN) can be set in the Web page as the common name for the SSL server certificate to be issued.

7. The image forming apparatus according to claim 6, wherein one of the plurality of types of identification information, which is not set as the identification information of the client apparatus, is set as a subject alternative name.

8. The image forming apparatus according to claim 1, wherein
the SSL server certificate is issued based on an issuance request, received from the client apparatus, for issuing the SSL server certificate.

9. The image forming apparatus according to claim 8, wherein the at least one processor is further configured to execute instructions stored in the memory to:
give a warning in a case where common name information of the SSL server certificate to be issued does not correspond to any of an IP address or a host name set in the image forming apparatus.

10. A method of controlling an image forming apparatus as an SSL server configured to issue an SSL server certificate to perform SSL communication, the image forming apparatus having a print unit, the method comprising:
receiving, from a client apparatus, an acquisition request for acquiring a Web page, the Web page being a setting page for inputting SSL server certificate settings, the acquisition request comprising an HTTP communication request for requesting execution of HTTP communication and including host information for identifying the image forming apparatus;
extracting identification information of at least the image forming apparatus from the HTTP communication request;
transmitting the Web page for inputting the SSL server certificate settings with the extracted identification information as an initial value of a common name for the SSL server certificate to be issued, to the client apparatus, the Web page for inputting the SSL server certificate settings with the extracted identification information as an initial value of a common name for the SSL server certificate to be issued;
receiving, from the client apparatus, an issuance request for issuing, based on the SSL server certificate settings inputted via the Web page, the SSL server certificate of the image forming apparatus; and
issuing the SSL server certificate for use in performing the SSL communication between the image forming apparatus and the client apparatus and transmit the issued SSL server certificate to the client apparatus.

11. A non-transitory computer-readable storage medium storing a computer-executable program for causing a computer to execute a method of controlling an image forming apparatus as an SSL server configured to issue an SSL server certificate to perform SSL communication, the image forming apparatus having a print unit, wherein the method comprises:
receiving, from a client apparatus, an acquisition request for acquiring a Web page, the Web page being a setting page for inputting SSL server certificate settings, the acquisition request comprising an HTTP communication request for requesting execution of HTTP communication and including host information for identifying the image forming apparatus;
extracting identification information of at least the image forming apparatus from the HTTP communication request;
transmitting the Web page for inputting the SSL server certificate settings with the extracted identification information as an initial value of a common name for the SSL server certificate to be issued, to the client apparatus, the Web page for inputting the SSL server certificate settings with the extracted identification information as an initial value of a common name for the SSL server certificate to be issued;
receiving, from the client apparatus, an issuance request for issuing, based on the SSL server certificate settings inputted via the Web page, the SSL server certificate of the image forming; and
issuing the SSL server certificate for use in performing the SSL communication between the image forming apparatus and the client apparatus and transmit the issued SSL server certificate to the client apparatus.

* * * * *